(12) United States Patent
Gutermuth

(10) Patent No.: US 11,782,202 B2
(45) Date of Patent: Oct. 10, 2023

(54) LIGHT GUIDE RECEPTACLE FOR MOUNTING A PLURALITY OF LIGHT GUIDES

(71) Applicant: ABB AG, Mannheim (DE)

(72) Inventor: Stefan Gutermuth, Hessen (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 17/686,645

(22) Filed: Mar. 4, 2022

(65) Prior Publication Data
US 2022/0283359 A1    Sep. 8, 2022

(30) Foreign Application Priority Data
Mar. 5, 2021    (DE) .......................... 102021105428.1

(51) Int. Cl.
| | |
|---|---|
| *G02B 6/00* | (2006.01) |
| *H01R 13/717* | (2006.01) |
| *F21V 8/00* | (2006.01) |
| *G02B 6/36* | (2006.01) |

(52) U.S. Cl.
CPC ......... *G02B 6/0008* (2013.01); *G02B 6/0001* (2013.01); *G02B 6/0005* (2013.01); *G02B 6/3616* (2013.01); *G02B 6/3648* (2013.01); *H01R 13/7172* (2013.01)

(58) Field of Classification Search
CPC ...... G02B 6/00; G02B 6/0005; G02B 6/0008; H01R 13/7172
See application file for complete search history.

(56) References Cited

U.S. PATENT DOCUMENTS

| | | | | |
|---|---|---|---|---|
| 5,812,730 | A  * | 9/1998 | Snyder ..................... | G02B 6/36 385/147 |
| 5,988,842 | A  * | 11/1999 | Johnsen ............... | G02B 6/0008 362/85 |
| 6,463,204 | B1 * | 10/2002 | Ati ....................... | G02B 6/0008 385/146 |
| 6,713,959 | B1 | 3/2004 | Toyoda et al. | |
| 9,989,698 | B2 * | 6/2018 | Yoshizumi .......... | G02B 6/0096 |
| 10,267,981 | B1 * | 4/2019 | Wu ...................... | G02B 6/0073 |
| 2004/0234902 | A1 | 11/2004 | Toyoda et al. | |
| 2008/0137361 | A1 * | 6/2008 | Ho ....................... | G02B 6/0006 362/555 |
| 2010/0060476 | A1 * | 3/2010 | Yajima ................ | G02B 6/4246 340/815.65 |

(Continued)

FOREIGN PATENT DOCUMENTS

| | | |
|---|---|---|
| CN | 106662702 A | 5/2017 |
| CN | 209994495 U | 1/2020 |

(Continued)

*Primary Examiner* — Michael Stahl
(74) *Attorney, Agent, or Firm* — Leydig, Voit & Mayer, Ltd.

(57) ABSTRACT

A light guide receptacle for mounting a plurality of light guides in the interior of a housing part, with a plurality of light bulkheads, is configured to arrange the plurality of light guides, which are mechanically coupled to one another by means of a web, in each case in intermediate spaces between two light bulkheads of the plurality of light bulkheads and to optically decouple spatially adjacent light guides from one another by means of the respective light bulkhead, wherein the plurality of light bulkheads are integrated components of the housing part.

10 Claims, 3 Drawing Sheets

(56) References Cited

U.S. PATENT DOCUMENTS

| | | | | |
|---|---|---|---|---|
| 2011/0141732 A1* | 6/2011 | Shiroishi | ............ | F21V 33/0052 |
| | | | | 362/235 |
| 2017/0357045 A1* | 12/2017 | Carullo | ............... | G02B 6/0008 |
| 2022/0287188 A1* | 9/2022 | Gutermuth | .......... | H05K 7/1418 |

FOREIGN PATENT DOCUMENTS

| | | | | |
|---|---|---|---|---|
| GB | 2464963 A | * | 5/2010 | |
| JP | 9-245985 A | | 9/1997 | |

\* cited by examiner

LIGHT GUIDE RECEPTACLE FOR MOUNTING A PLURALITY OF LIGHT GUIDES

CROSS-REFERENCE TO RELATED APPLICATIONS

This patent application is a convention application claiming priority to German Patent Application No. DE 102021105428.1, filed on Mar. 5, 2021, which is incorporated herein in its entirety by reference.

BACKGROUND OF THE INVENTION

LED light guides in an electronic device housing must be protected against optical crosstalk between different light guide line elements. The standard solution is to arrange an additional "opaque" plastic part that partially or completely covers the light guide to avoid this crosstalk. Such plastic parts can be designed to extend a clearance and creepage distance between breakdown openings of an LED light guide output and electronics on the inner circuit board of a device housing to avoid unwanted electrostatic discharge (ESD).

BRIEF SUMMARY OF THE INVENTION

The standard solutions proposed by the prior art, such as an additional plastic part, may incur additional tooling costs, parts costs, and additional costs due to an additional assembly step in production.

According to aspects of the present disclosure, a light guide receptacle for mounting a plurality of light guides inside a housing part, a housing part with a light guide receptacle, and a use of a housing part, according to the features of the independent claims are proposed. Advantageous embodiments are the subject of the dependent claims as well as the following description.

According to one aspect, a light guide receptacle for mounting a plurality of light guides in the interior of a housing part (or housing member) is proposed, comprising a plurality of light bulkheads, wherein the plurality of light bulkheads is configured to arrange the plurality of light guides, which are mechanically coupled to each other via a web or bar, respectively in intermediate spaces between two light bulkheads of the plurality of light bulkheads and to optically decouple spatially adjacent light guides from each other by means of the respective light bulkhead, wherein the plurality of light bulkheads are integrated components of the housing part.

BRIEF DESCRIPTION OF THE SEVERAL VIEWS OF THE DRAWING(S)

With the following figures, the embodiments are further explained.

DETAILED DESCRIPTION OF THE INVENTION

Figure 1:
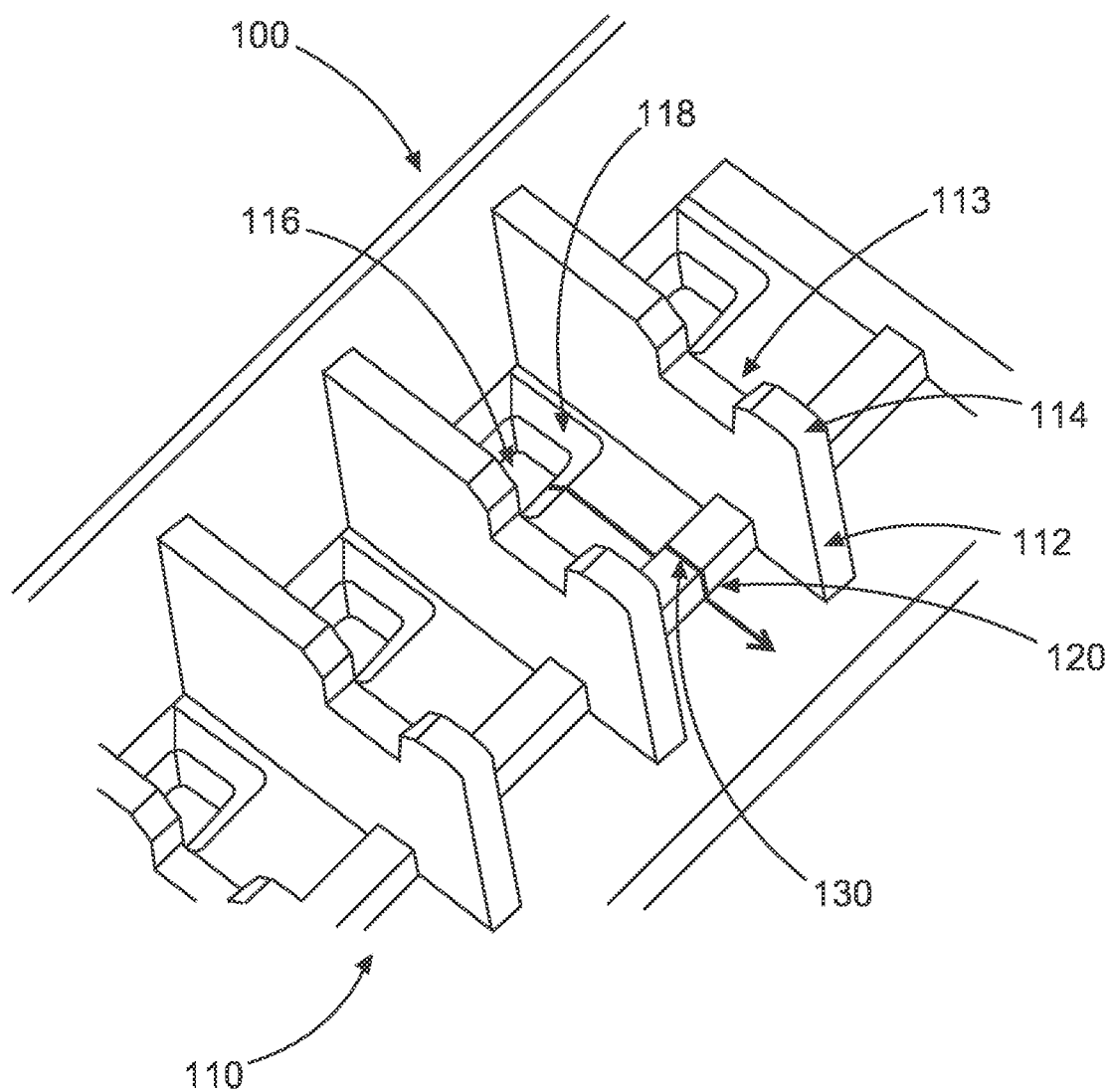
FIG. 1 illustrates a light guide receptacle in accordance with the disclosure.

Embodiments of the present disclosure include a plurality of light bulkheads of the light guide receptacle, which plurality of light bulkheads is integrally connected and integrated with the light guide receptacle. In this way, a simple assembly of the plurality of light guides is made possible, since in particular two light bulkheads of the plurality of light bulkheads each forms a chamber for the respective light guide of the plurality of light guides and can be guided accordingly several times during the assembly and thus can prevent an incorrect insertion and, moreover, can be used for a precise positioning of the plurality of light guides.

Advantageously, the light guide receptacle thus both accommodates the plurality of light guides in the upper portion of the housing and optically decouples the plurality of light guides from each other. Each one of the plurality of light guides thus positions individual light guides of the plurality of light guides during assembly.

Advantageously, the plurality of light bulkheads form a respective optically decoupling partition, each of which may be an integral one-piece component of the light guide receptacle and/or an integral and one-piece component of the housing portion. In other words, the respective light bulkhead of the plurality of light bulkheads prevents crosstalk of light signals between adjacent light guides of the plurality of light guides without the need for a separate plastic part to be mounted and/or placed in the housing part.

In particular, the light guide receptacle may be integrally connected to the housing portion.

Preferably, the light guide receptacle is arranged to arrange the plurality of light guides between respective adjacent light bulkheads, the plurality of light guides being arranged to redirect light, in particular at right angles.

In this regard, the respective light guide of the plurality of light guides may be provided with an entrance window and an exit window to reflect the light entering the respective light guide at the entrance window perpendicularly by means of a reflective surface of the respective light guide.

Preferably, the respective light bulkheads of the plurality of light bulkheads include a recess that at least partially surrounds the web, respectively, to define a position of the web of the plurality of light guides.

In this regard, the recess of the respective bar may be U-shaped to at least partially encompass the assembled bar.

Preferably, the respective light bulkheads of the plurality of light bulkheads include a beveled insertion member to assist in mounting the plurality of light guides at an intended position.

Advantageously, a self-adjustment of the web of the plurality of light guides during the assembly of the plurality of light guides can be achieved by at least one beveled insertion element of the respective light bulkhead.

Preferably, for each of the plurality of optical fibers, the optical fiber receptacle includes an aperture configured to receive and optically couple the respective optical fiber to an exterior surface of the housing part.

The respective aperture of the optical fiber receptacle may be implemented by a corresponding respective aperture in the housing portion.

Advantageously, receiving the respective light guide in the aperture causes the respective light guide to be positioned in the light guide receptacle.

Particularly preferably, the breakthrough opening in the housing part is conically tapered for self-adjustment when the respective light guide is mounted in the respective breakthrough opening.

Advantageously, this assists in mounting the plurality of light guides to correctly position the respective light guide for coupling to an exterior portion of the housing part.

Preferably, a discharge barrier connecting the two light bulkheads is arranged between each two light bulkheads, which discharge barrier is arranged to extend a distance from the respective breakthrough opening in the housing part to an entrance window of a mounted light guide for reducing electrostatic effects.

The discharge barrier, which is arranged connectingly between two respective light bulkheads of the light guide receptacle, can be arranged to extend a distance for an electrical or electrostatic break-through from the respective break-through opening in the light guide receptacle and the housing part to an entrance window of a respective mounted light guide. electrostatic breakdown from the respective breakdown opening in the light guide receptacle and the housing part to an entrance window of a respective mounted light guide, since a shape of a light guide of the plurality of light guides may be shaped corresponding to a bottom surface of the light guide receptacle, resulting in a longer distance for an electric or electrostatic breakdown current when the correspondingly shaped light guide is mounted. In other words, the shaping of the light guide receptacle with the discharge barrier at a bottom surface of the light guide receptacle results in an extension of a shortest path for equalizing electric fields once a correspondingly shaped light guide is mounted. The integrated electrostatic discharge barrier causes an extension of the clearance and creepage distances to prevent electrostatic discharge of the device user at the LED exit point at the breakthrough opening on the housing part onto light emitting elements (LEDs) on an electronic circuit board inside the housing part.

Advantageously, this can be achieved with the described light guide receptacle without additional plastic parts.

Preferably, the light guide receptacle, by means of a latching hook receptacle, is adapted to latchingly receive a latching hook of the plurality of light guides mechanically coupled to a web for locking the plurality of light guides.

By means of the snap-in hook receptacle, the plurality of light guides can be locked in the housing part in a functionally reliable manner, in particular in order to be able to mount printed circuit boards in the housing part, which can be rotated into suitable positions for this purpose without the plurality of light guides leaving their intended position.

Preferably, the light guide receptacle is adapted by means of at least one groove to receive at least one adjustment pin mechanically coupled to the plurality of light guides for adjusting the plurality of light guides. Through this groove, a plurality of light guides can be easily adjusted when mounted in the light guide receptacle.

A housing part (housing member) having an optical fiber receptacle described above is proposed, wherein a plurality of optical bulkheads of the optical fiber receptacle are integrally formed in the housing part.

A housing part having one of the light guide receptacles described above is proposed, wherein the entire light guide receptacle is integrally formed in the housing part.

The fact that the light bulkheads and/or the light guide receptacle are integrated in one piece into the housing part means that there is no need for additional assembly work and/or manufacturing work for the respective parts.

A use of a housing part described above for mounting a stored program controller in a housing with the housing part is proposed, wherein the housing part is adapted to receive a first circuit board adapted to be optically coupled to an optical fiber.

Advantageously, by means of the described housing part, a plurality of optical fibers for mounting the optical fibers can be easily mounted and locked in the housing portion to easily mount and couple the printed circuit board arranged to be optically coupled with at least one optical fiber to the plurality of optical fibers.

FIG. 1 schematically shows an isometric representation of three light bulkheads 112 of the light guide receptacle 110 of a housing part 100, wherein the respective light bulkheads 112 each comprise a recess 113 for fixing a web or bar 220b (FIG. 3) of a coupled plurality of respective light guides 200a (FIG. 4) in a position in the housing part 100, wherein the recess 113 of the respective light bulkheads 112 is adapted to at least partially encompass the web 220b, respectively. In this regard, the respective light bulkhead 112 having a bevelled insertion element 114 is adapted to assist an assembly of the plurality of light guides 200 at the intended position of the light guide receptacle 110 by being able to self-adjust the insertion of the web 220b into the respective recess 113 through the bevelled shape.

Furthermore, the light guide receptacle 110 for the respective light guide 200a has aperture openings 116 in the housing portion 100 to receive portions of the respective light guide 200a of the plurality of light guides 200 and optically couple them to an outer surface of the housing portion 100. In this regard, the aperture opening 116 in the housing portion 100 is configured with a taper 118 to achieve self-alignment of the respective light guide 200a when the plurality of light guides 200 are mounted to the respective aperture opening 116.

A discharge barrier 120 connecting the two light bulkheads 112 is arranged between each two light bulkheads 112 of the light guide receptacle 110 in order to extend a distance 130 from the respective breakthrough opening 116 in the housing part 100 to an entry window of a respective mounted light guide 200a for reducing electrostatic effects, such as in particular an electrical discharge between an outer region of the housing part 100 and electronics to be protected, for example on a printed circuit board 210, inside the housing part.

Figure 2:
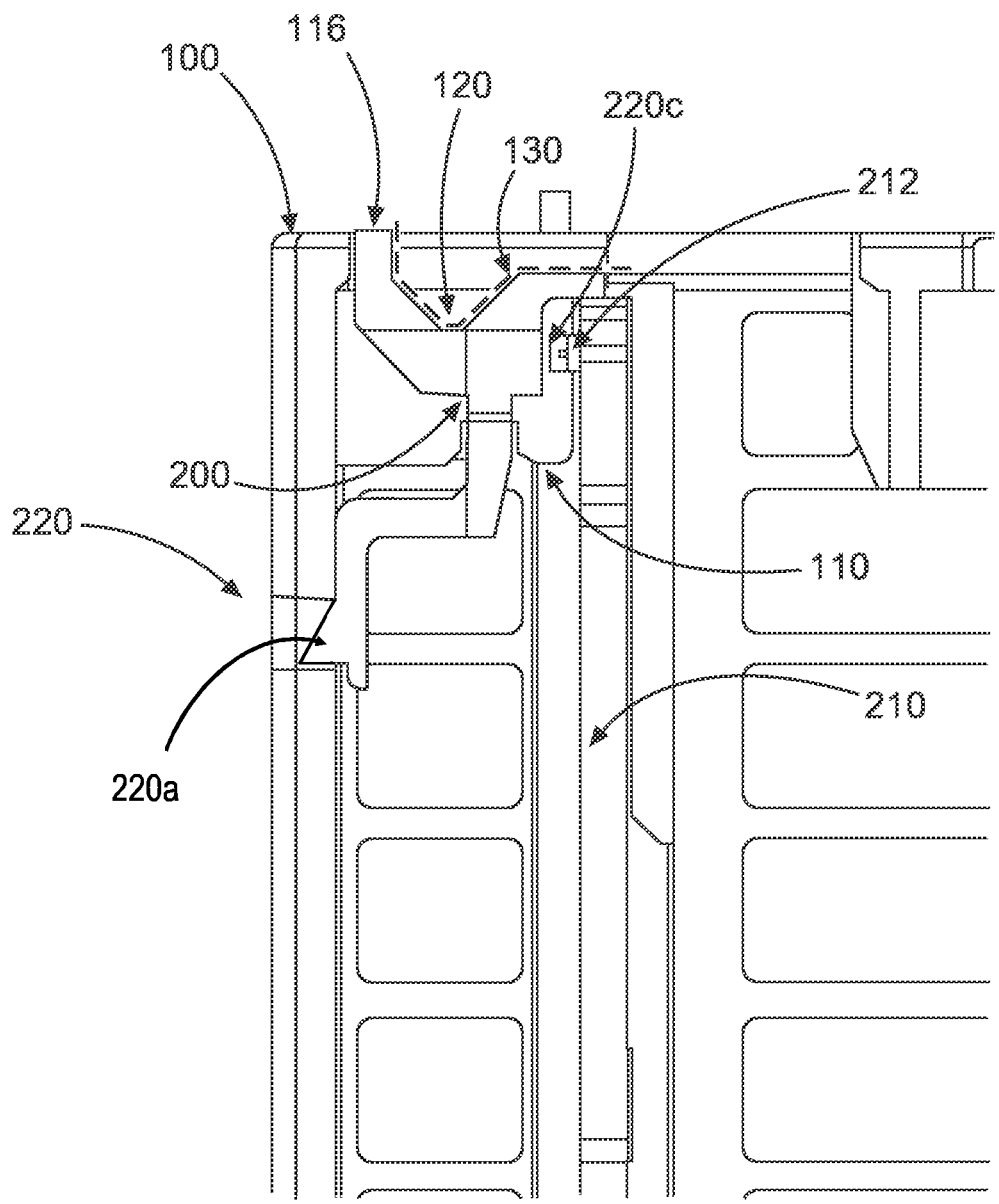
FIG. 2 illustrates a cross-section through a housing with a light guide in a light guide receptacle in accordance with the disclosure.

FIG. 2 schematically shows a cross-sectional view of the housing part 100 having a light guide receptacle 110 in which a plurality of light guides 200 are mounted, and a printed circuit board 210 mounted in the housing part 100.

The circuit board 210 includes at least one light emitting diode (LED) 212 disposed in the housing portion 100 with the circuit board 210 and adapted to cooperate with a light guide 200a, that is, a light guide element 200a, of the plurality of light guides 200 at the entrance window 220c of the light guide 200a to optically couple with an outer portion of the housing portion 100. Further, the light guide receptacle 110 is shown as having an opening 220 corresponding to a latching hook 220a of the plurality of coupled light guides 200 to lock the plurality of light guides 200 in the light guide receptacle 110.

In the cross-sectional view of FIG. 2, it is sketched how the discharge barrier 120, which is disposed between each two light bulkheads 112 of the light guide receptacle 110 and integrally connects the two light bulkheads 112 to each other, extends a distance 130 between the respective aperture 116 in the housing portion 100 to the entrance window 220c of a light guide 200a of the plurality of light guides 200 when the respective light guide 200a is mounted in the light guide receptacle 100.

By extending this distance 130, it can be achieved that an electronic device to be protected, for example on a printed circuit board 210, within the housing part, is protected from electrostatic discharge. Since a higher voltage would be required for an electrical discharge over a longer distance 130.

Figure 3:
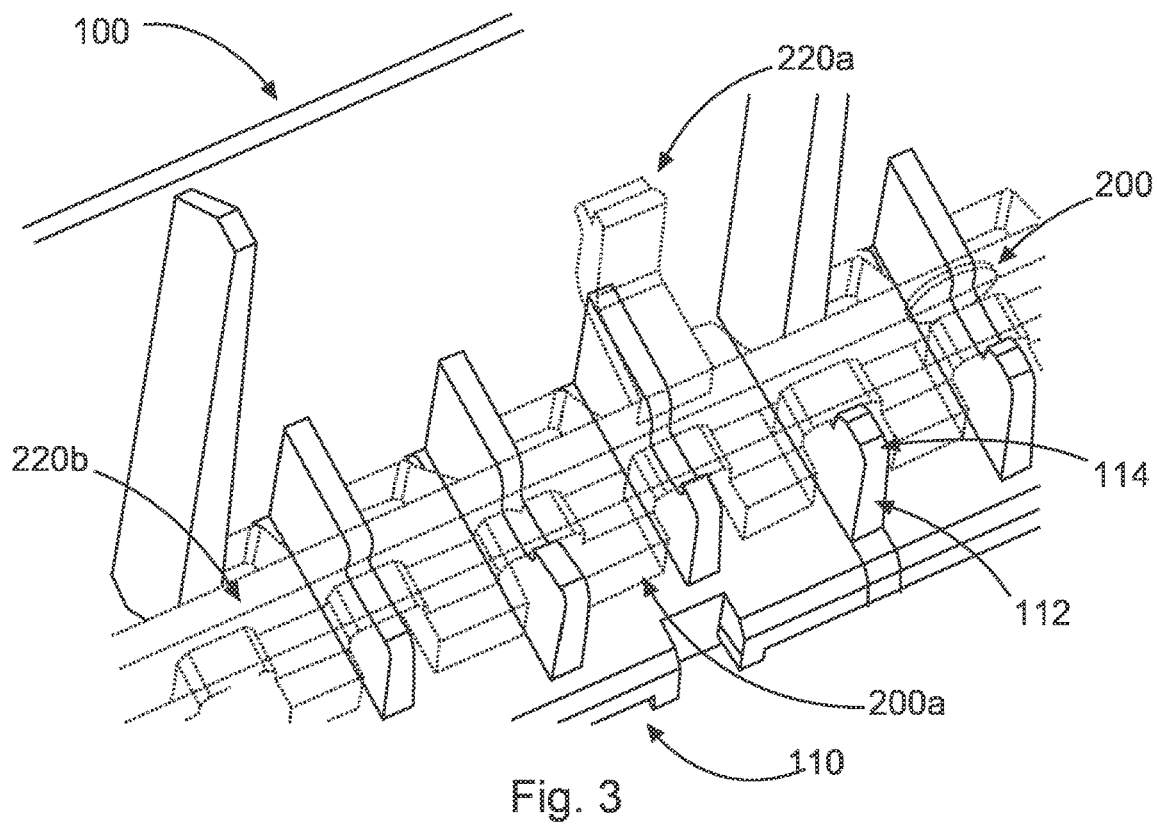
FIG. 3 illustrates a light guide receptacle with a plurality of light guides mounted thereon in accordance with the disclosure.

FIG. 3 schematically shows an isometric representation of the light guide receptacle 110 of the housing part 100 in which the plurality of light guides 200 are inserted, wherein the individual light guides 200a, which are mechanically coupled to the web 220b, are each optically decoupled from one another by the light bulkhead 112, and the light bulkheads 112 are arranged by means of bevelled insertion elements 114 to support the insertion of the plurality of light guides 200. Furthermore, it is shown how a latching hook 220a of the plurality of coupled light guides 200 is locked in a corresponding opening in the light guide receptacle 110 of the housing portion 100.

Figure 4:
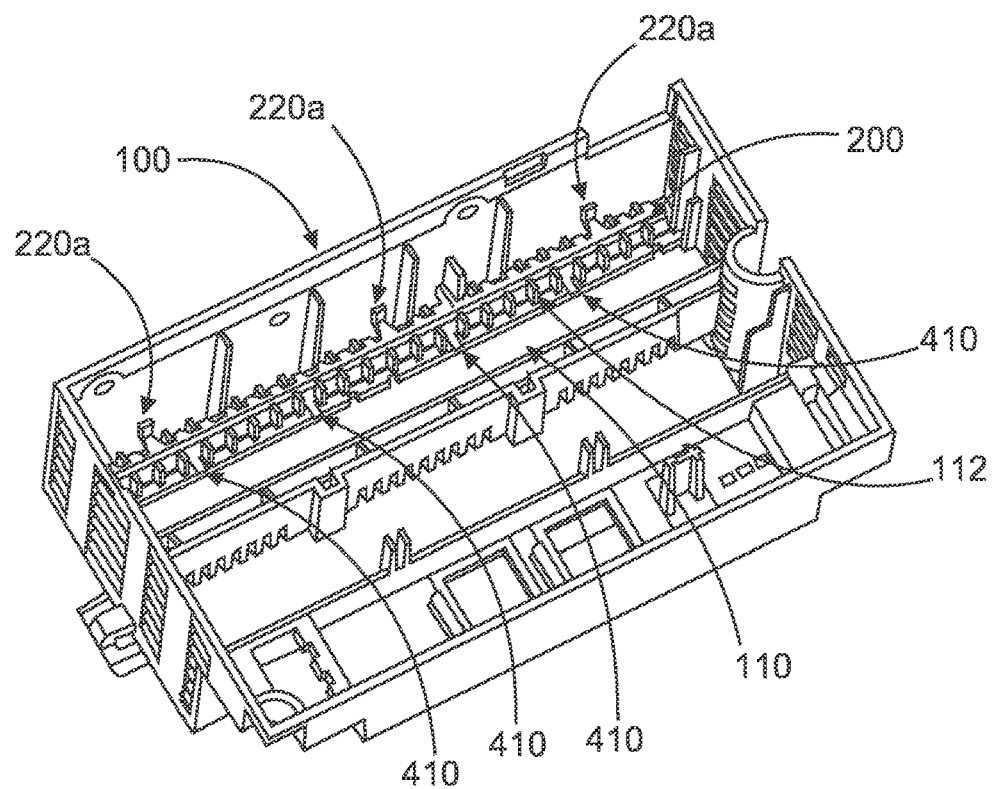
FIG. 4 illustrates a housing part with a light guide receptacle and a mounted plurality of light guides in accordance with the disclosure.

FIG. 4 schematically illustrates an isometric view of an interior of the housing part 100. The housing part 100 includes the light guide receptacle 110 for the plurality of light guides 200 with corresponding openings for the described latching hooks 220a of the plurality of light guides 200, and recesses 113 (see FIG. 1) corresponding to adjustment tabs 410 of the plurality of light guides 200 to receive the adjustment tabs 410 during assembly of the plurality of light guides 200.

In FIG. 4, a plurality of optical fibers 200 are mounted in the optical fiber receptacle 110 of the housing part 100.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A light guide receptacle configured to mount a plurality of light guides in the interior of a housing part, comprising:
   a plurality of light bulkheads configured to arrange the plurality of light guides,
   wherein the plurality of light guides are mechanically coupled to one another by a web in intermediate spaces between two light bulkheads of the plurality of light bulkheads,
   wherein a respective light bulkhead of the plurality of light bulkheads optically decouples spatially adjacent light guides from one another,
   wherein the plurality of light bulkheads are integrated components of the housing part,
   wherein a respective discharge barrier connecting each respective two light bulkheads of the plurality of light bulkheads is arranged between the each respective two light bulkheads, and
   wherein the respective discharge barrier extends a distance from a respective aperture for each of the plurality of light guides in the housing part, to an entry window of a respective mounted light guide for reducing electrostatic effects.

2. The light guide receptacle according to claim 1, wherein the light guide receptacle is configured to arrange the plurality of light guides between respective adjacent light bulkheads, the plurality of light guides being configured to deflect light at an angle.

3. The light guide receptacle according to claim 2, wherein the angle is a right angle.

4. The light guide receptacle according to claim 1, wherein each of the respective light bulkheads of the plurality of light bulkheads comprises a recess configured to at least partially surround at least a portion of the web, and wherein an engagement of the recess and the web determines a position of the web relative to the plurality of light guides.

5. The light guide receptacle according to claim 1, wherein each of the respective light bulkheads of the plurality of light bulkheads comprises a tapered insertion member to support mounting of the plurality of light guides at a designated position.

6. The light guide receptacle according to claim 1, wherein the respective aperture for each of the plurality of light guides is configured to receive and optically couple the respective light guide to an outer surface of the housing part.

7. The light guide receptacle according to claim 6, wherein the aperture in the housing part is tapered to facilitate self-adjustment when mounting the respective light guide in the respective aperture.

8. The light guide receptacle according to claim 1, further comprising a latching hook receptacle that latchingly receives a latching hook of each of the plurality of light guides, the latching hook being mechanically coupled to the web for locking the plurality of light guides.

9. The light guide receptacle according to claim 1, further comprising at least one groove that receives at least one adjustment pin mechanically coupled to the plurality of light guides for adjusting the plurality of light guides.

10. A housing, comprising:
an optical fiber receptacle, the optical fiber receptacle configured to accommodate a plurality of optical fibers, the optical fiber receptacle comprising:
a plurality of light bulkheads configured to arrange the plurality of optical fibers,
wherein the plurality of optical fibers is mechanically coupled to one another by a web in intermediate spaces between two light bulkheads of the plurality of light bulkheads,
wherein a respective light bulkhead of the plurality of light bulkheads optically decouples spatially adjacent optical fibers from one another,
wherein the plurality of light bulkheads is an integrated component of the housing,
wherein a respective discharge barrier connecting each respective two light bulkheads of the plurality of light bulkheads is arranged between the each respective two light bulkheads, and
wherein the respective discharge barrier extends a distance from a respective aperture for each of the plurality of optical fibers in the housing, to an entry window of a respective mounted optical fiber for reducing electrostatic effects.

\* \* \* \* \*